US006774708B2

(12) United States Patent
Matsui

(10) Patent No.: US 6,774,708 B2
(45) Date of Patent: Aug. 10, 2004

(54) VOLTAGE BOOSTING CIRCUIT WITH TWO MAIN CHARGE PUMPS

(75) Inventor: Katsuaki Matsui, Kanagawa (JP)

(73) Assignee: OKI Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/218,078

(22) Filed: Aug. 14, 2002

(65) Prior Publication Data

US 2003/0058029 A1 Mar. 27, 2003

(30) Foreign Application Priority Data

Sep. 27, 2001 (JP) ........................................ 2001-296670

(51) Int. Cl.[7] ................................................ G05F 3/02
(52) U.S. Cl. ......................... 327/536; 327/537; 363/59
(58) Field of Search ................................ 327/534, 536, 327/537; 365/226, 227, 229; 363/59

(56) References Cited

U.S. PATENT DOCUMENTS 4,961,007 A * 10/1990 Kumanoya et al. ......... 327/537
4,964,082 A * 10/1990 Sato et al. ............. 365/189.09
5,337,284 A * 8/1994 Cordoba et al. ............. 365/227
5,434,820 A * 7/1995 Kim ...................... 365/189.09
5,877,651 A * 3/1999 Furutani .................... 327/538
6,031,411 A * 2/2000 Tsay et al. .................. 327/536
6,137,343 A * 10/2000 Matano ...................... 327/535
6,285,622 B1 * 9/2001 Haraguchi et al. .......... 365/226

FOREIGN PATENT DOCUMENTS

JP          10-247386 A      9/1998
JP         2000-112547 A     4/2000

* cited by examiner

Primary Examiner—Terry D. Cunningham
(74) Attorney, Agent, or Firm—Rabin & Berdo, P.C.

(57) ABSTRACT

A voltage boosting circuit has two charge pumps connected to an output node from which a boosted potential, higher than the power-supply potential, is supplied to a load circuit. One charge pump is activated when the load circuit is activated, regardless of the output node potential. The other charge pump is activated while the load circuit is active, if the potential of the output node falls below a predetermined level. Use of these two charge pumps reduces electrical noise and ensures that the output node is brought to an adequate potential when the load circuit is activated.

15 Claims, 6 Drawing Sheets

US 6,774,708 B2

VOLTAGE BOOSTING CIRCUIT WITH TWO MAIN CHARGE PUMPS

BACKGROUND OF THE INVENTION

1. Field of the Invention

The present invention relates to a voltage boosting circuit for generating a voltage higher than the power-supply voltage in, for example, a semiconductor memory device.

2. Description of the Related Art

Voltage boosting circuits are used in various types of semiconductor devices. As one example, voltage boosting circuits are used in dynamic random-access memory (DRAM) devices to generate a potential exceeding the power-supply potential by at least the threshold voltage of the transistors in the memory-cell array. This boosted potential is useful for writing data into the memory cells.

A conventional voltage boosting circuit of the type used in a DRAM comprises a pair of charge pumps coupled to an output node. One charge pump, which is capable of supplying only a relatively small amount of current, is activated whenever the output node potential falls below the required level; this charge pump is used primarily to compensate for the small amount of current leakage that occurs during standby periods. The other charge pump, which can supply more current, is activated if the output node potential falls below the required level during active periods, while the memory cells are being accessed.

One disadvantage of this conventional voltage boosting circuit is that the potential of the output node at the start of a memory access operation varies, depending on, for example, the elapsed time since the preceding memory access operation, the duration of the previous memory access operation, and the rate at which current was consumed during that memory access operation. As a result, voltage boosting tends to occur at unpredictable times during the memory access operation and can cause electrical noise problems. In addition, for some combinations of the above factors, the charge-pump operation becomes unstable, and the output node potential deviates greatly from the desired potential.

This stability problem is aggravated if there is a long delay in detecting the potential level of the output node. The severity of the problem could be reduced by shortening the detection delay, by detecting the potential at more frequent intervals, for example, but the circuit that detects the output node potential consumes power in doing so, so this solution would have the undesired consequence of increasing the total power dissipation of the device.

Further information about the above problems, which are not limited to memory circuits, will be given in the detailed description of the invention.

SUMMARY OF THE INVENTION

An object of the present invention is to improve the stability of operation of a voltage boosting circuit.

Another object of the invention is to reduce electrical noise.

The invented voltage boosting circuit receives power at a power-supply potential and supplies current from an output node to a load circuit. The voltage boosting circuit includes a first charge pump that boosts the output node to a potential exceeding the power-supply potential when the load circuit becomes active, as indicated by a control signal. The voltage boosting circuit also includes a second charge pump that boosts the output node to a potential exceeding the power-supply potential if the potential of the output node goes below a predetermined level while the load circuit is active, as indicated by the control signal and an activation signal. The voltage boosting circuit further includes a voltage detector that detects the potential of the output node and generates the activation signal.

The first charge pump improves the stability of the voltage boosting circuit by ensuring that the output node is always boosted to an adequate potential when the load circuit becomes active. This reduces the need for charge pumping during the ensuing period while the load circuit is active, so less electrical noise is generated while the load circuit is operating.

The activation signal may be synchronized with the control signal so that the second charge pump operates only if the output node potential is below the predetermined level when the load circuit becomes active, to further reduce electrical noise while the load circuit is operating.

In this case, the operation of the second charge pump may be delayed by a fixed interval from the operation of the first embodiment, reducing electrical noise by ensuring that the two charge pumps do not operate simultaneously.

The first charge pump may have a switchable current-supplying capability, which can be selected according to the requirements of the load circuit to avoid unnecessary boosting of the potential of the output node.

DETAILED DESCRIPTION OF THE INVENTION

Figure 1:
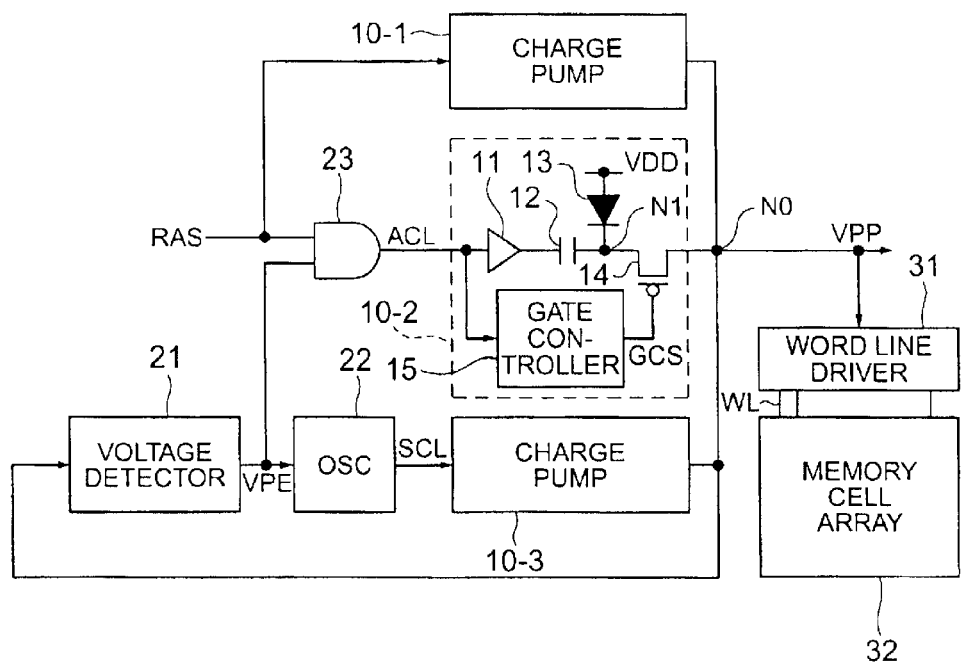
FIG. 1 is a block diagram of a voltage boosting circuit illustrating a first embodiment of the invention.

Embodiments of the invention will now be described with reference to the attached drawings, in which like elements are indicated by like reference characters.

Referring to FIG. 1, in the first embodiment, the voltage boosting circuit receives a row address strobe (RAS) signal, and generates a boosted potential VPP at an output node N0. The voltage boosting circuit comprises three charge pumps 10-1, 10-2, 10-3, all having the same internal structure. As shown for the second charge pump 10-2, this internal structure includes a buffer amplifier circuit 11 (referred to below simply as a buffer), a capacitor 12, a diode 13, a p-channel metal-oxide-semiconductor (PMOS) transistor 14, and a gate controller 15.

The buffer 11 and gate controller 15 receive an input signal that functions as a clock signal. The buffer 11 supplies the logic level of the input signal to one plate of the capacitor 12. The other plate of the capacitor 12 is interconnected to the cathode of the diode 13 and the source electrode of the PMOS transistor 14 at an internal node N1. The anode of the diode 13 receives a power-supply potential VDD. The drain electrode of the PMOS transistor 14 is coupled to the output node N0. The gate electrode of the PMOS transistor 14 receives a gate control signal GCS from the gate controller 15, which generates the gate control signal GCS by inverting the input clock signal.

The capacitor 12 in the third charge pump 10-3 is smaller than the capacitors 12 in the first and second charge pumps 10-1, 10-2. The first and second charge pumps 10-1, 10-2 are accordingly capable of supplying more current to the output node N0 than is the third charge pump 10-3.

When it is not necessary to distinguish among the charge pumps 10-1, 10-2, 10-3, the single reference numeral 10 will be used.

The voltage boosting circuit also comprises a voltage detector 21, an oscillator (OSC) 22, and an AND gate 23. The boosted output potential VPP is supplied from the output node N0 through a word line driver 31 to a memory cell array 32 in a DRAM device. The load circuit of the voltage boosting circuit includes the word line driver 31 and the word lines WL driven by the word line driver 31. The row address strobe signal RAS goes to the high logic level (VDD) when the memory cell array 32 is being accessed, and remains at the low logic level (ground level) at other times.

The voltage detector 21 is connected to the output node N0 and detects the potential thereof. The voltage detector 21 generates an activation signal VPE that goes to the high logic level if the potential of the output node N0 falls below a predetermined level. In the subsequent description, it will be assumed that the predetermined level is VDD+Vt, where Vt is the threshold voltage of transistors used in the word line driver 31 and memory cell array 32. When the potential of the output node N0 rises above the predetermined level (VDD+Vt), the activation signal VPE goes to the low logic level. The voltage detector 21 operates with an internal detection delay (dt).

The oscillator 22 receives the activation signal VPE from the voltage detector 21 and generates a clock signal SCL that alternates between the high and low logic levels while the activation signal VPE is high. This clock signal SCL is supplied to the third charge pump 10-3. SCL is held at the low logic level when VPE is low. The oscillator 22 is internally configured as, for example, a ring oscillator.

The AND gate 23 receives the activation signal VPE from the voltage detector 21 and the row address strobe signal RAS, and generates another clock signal ACL. The ACL clock signal goes high when VPE and RAS are both active (high), and goes low when either VPE or RAS is inactive (low). ACL is supplied to the second charge pump 10-2 as its clock input signal.

The clock input signal of the first charge pump 10-1 is the row address strobe signal RAS.

An example of the operation of the first embodiment will now be described with reference to FIG. 2.

In this example, initially (at time T0), the row address strobe signal RAS is low and the boosted potential VPP is above the predetermined level (VDD+Vt). The activation signal VPE, clock signal ACL, and clock signal SCL (not shown) are accordingly low, while the gate control signal GCS in each charge pump 10 is high. In each charge pump 10, the output of the buffer 11 is at the low logic level (ground level), the PMOS transistor 14 is switched off, and the capacitor 12 is charged to a voltage of substantially VDD through the diode 13, so that node N1 is at substantially the VDD potential level.

At time T1, the row address strobe signal RAS is driven to the high logic level to begin a memory access operation. In the first charge pump 10-1, the output of the buffer 11 goes to the high logic level (VDD), boosting the level of node N1 by capacitive coupling through the capacitor 12 to substantially twice the VDD level. Diode 13 therefore switches off, preventing charge from flowing from node N1 to VDD. In addition, the gate control signal GCS goes low, switching on the PMOS transistor 14. The potential of node N1 in the first charge pump 10-1 is now higher than the potential of the output node N0, so charge flows from node N1 to the output node N0 and the output potential VPP begins to rise.

At time T2, the potential of the output node N0 reaches a maximum level and then begins to fall, as charge is supplied to the word line driver 31 as current for driving the word lines WL in the memory access operation.

At time T3, the potential of the output node N0 falls to the predetermined level (VDD+Vt). This is detected by the voltage detector 21 with a detection delay dt. The activation signal VPE then goes high at time T4, raising clock signal ACL to the high logic level. In the second charge pump 10-2, the output of the buffer 11 goes high, boosting the potential of node N1 in the second charge pump 10-2 as explained above.

At time T5, the gate control signal GCS in the second charge pump 10-2 goes low, switching on the PMOS transistor 14, and charge begins to flow from node N1 in the second charge pump 10-2 to the output node N0. The potential of the output node N0 thus rises again, soon returning to the predetermined level (VDD+Vt). Some of the charge that flows from node N1 in the second charge pump 10-2 to node N0 is supplied as current to the word line driver 31; the rest is stored in the capacitor 12 in the first charge pump 10-1 and the stray capacitance of the signal lines coupled to node N0.

Figure 2:
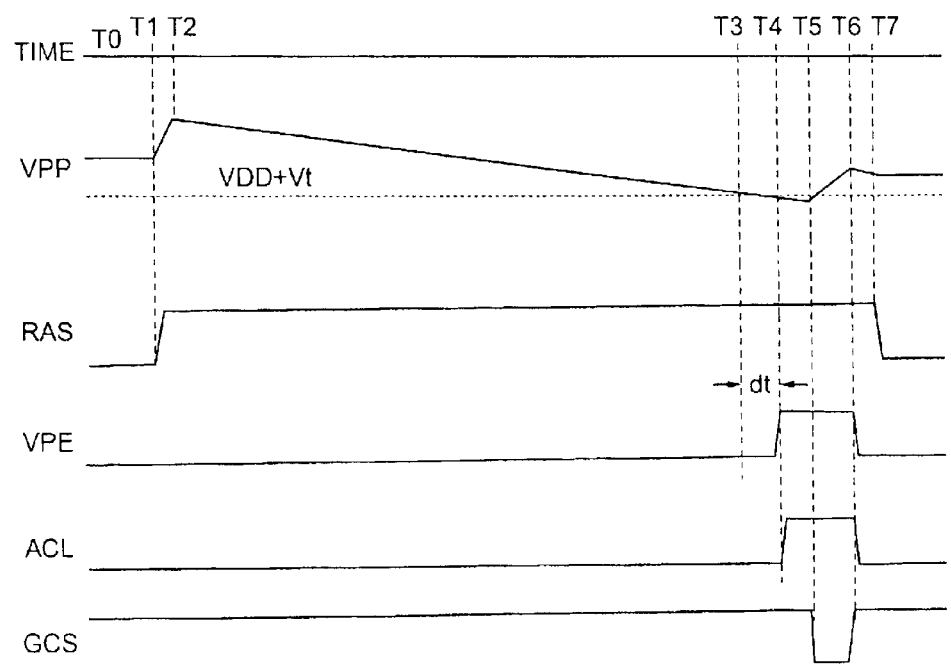
FIG. 2 is a timing waveform diagram illustrating the operation of the first embodiment.

The third charge pump 10-3 also operates during the interval following time T4, in synchronization with clock signal SCL, but its contribution to the voltage-boosting operation is comparatively minor, and is omitted from FIG. 2 for simplicity.

At time T6, after another detection delay, the voltage detector 21 resets the activation signal VPE to the low logic level to indicate that the potential of the output node N0 is above the predetermined level (VDD+Vt), thereby bringing the clock signals ACL and SCL to the low logic level. In the second and third charge pumps 10-2, 10-3, the output of the buffer 11 goes low, reducing internal node N1 to a potential below VDD. The gate control signal GCS immediately goes high, however, switching off the PMOS transistor 14 so that charge cannot escape from the output node N0 to the internal node N1 in these charge pumps 10-2, 10-3. The charge stored at the output node N0, including charge stored in the capacitor 12 in the first charge pump 10-1, thus continues to be supplied as current to the word line driver 31.

At time T7, the row address strobe signal RAS goes low, ending the memory access operation. In the first charge pump 10-1, the output of the buffer 11 goes low, thereby reducing the potential of node N1, but the gate control signal GCS goes high, switching off the PMOS transistor 14 and decoupling node N1 from the output node N0.

After time T7, during the standby period until the next memory access operation begins, the potential of the output node N0 continues to decline due to current leakage, but the decline is quite slow. If the potential of the output node N0 falls below the predetermined level (VDD+Vt) during the standby period, the activation signal VPE goes high, activating the oscillator 22, and the third charge pump 10-3 boosts the output node N0 back to a potential above VDD+Vt, in a series of small steps, in synchronization with clock signal SCL.

Figure 3:
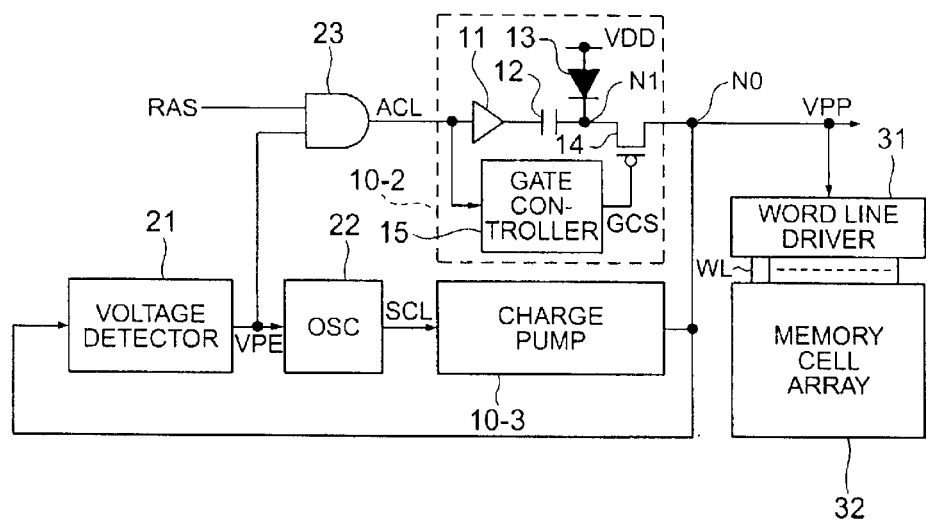
FIG. 3 is a block diagram of a conventional voltage boosting circuit.
Figure 4:
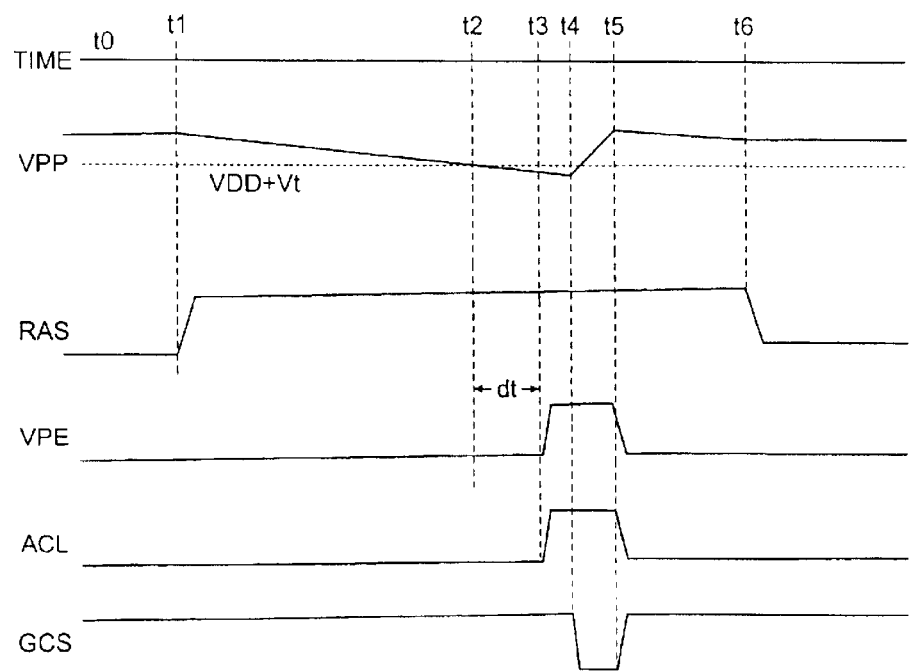
FIG. 4 is a timing waveform diagram illustrating the operation of the conventional voltage boosting circuit.

The effect of the first embodiment can best be appreciated through a comparison with a conventional voltage boosting circuit lacking the first charge pump 10-1. One such voltage boosting circuit is shown in FIG. 3. Except for the absence of the first charge pump, this voltage boosting circuit has the same configuration as the voltage boosting circuit in the first embodiment. FIG. 4 shows an example of the operation of the voltage boosting circuit in FIG. 3. The starting conditions at time t0 are the same as in FIG. 2. At time t1, the row address strobe signal RAS goes high and the potential of the output node N0 immediately begins to fall as current is supplied to the word line driver 31. At time t2 the potential of the output node N0 falls to the predetermined level (VDD+Vt). After the detection delay dt, the activation signal VPE and clock signal ACL go high at time t3. The gate control signal GCS in the second charge pump 10-2 goes low at time t4. The output node N0 is now boosted back to a potential above the predetermined level (VDD+Vt). This is detected at time t5, at which point VPE and ACL go low and GCS goes high.

The second charge pump 10-2 in FIG. 3 does the work of both the first and second charge pumps 10-1, 10-2 in FIG. 1, and must therefore have a current-supplying capability substantially equal to the combined current-supplying capability of the first and second charge pumps in FIG. 1. The first and second charge pumps 10-1, 10-2 in FIG. 1 accordingly each have smaller current-supplying capabilities than the conventional current-supplying capability of the second charge pump 10-2 in FIG. 3. For example, the first and second charge pumps 10-1, 10-2 in FIG. 1 may each have half the conventional current-supplying capability, i.e., the capacitance of capacitor 12 in FIG. 1 is half the capacitance of capacitor 12 in FIG. 3.

Operation of the first and second charge pumps 10-1, 10-2 in FIG. 1 therefore causes a slower rise in the VPP potential than does operation of the second charge pump 10-2 in FIG. 3. One beneficial effect of this slower rise is less electrical noise: for example, less fluctuation in the power-supply potential VDD and the ground level due to charge and discharge of the capacitors 12. Another beneficial effect is that the magnitude of the fluctuations in the VPP level due to operation of the charge pumps is reduced.

Figure 5:
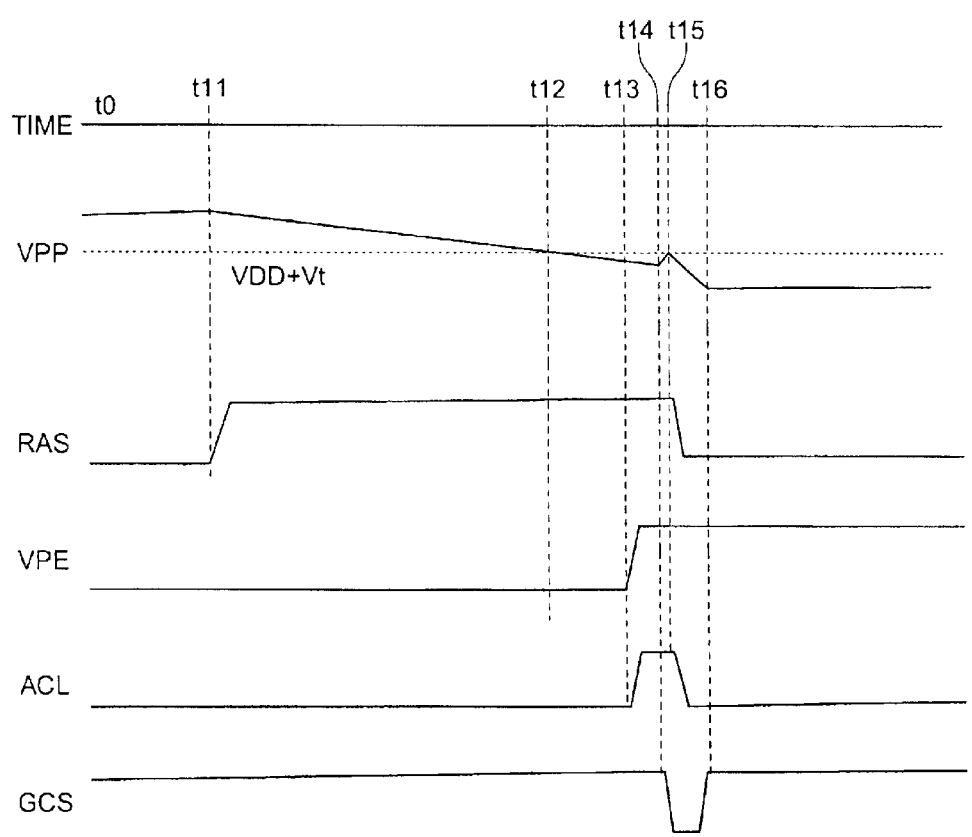
FIG. 5 is a timing waveform diagram illustrating a problem encountered in the operation of the conventional voltage boosting circuit.

FIG. 5 shows another example of the operation of the conventional voltage boosting circuit in FIG. 3. The initial conditions and the events at times t11, t12, t13, and t14 are the same as the initial conditions and the events at times t1, t2, t3, and t4 in FIG. 4. At time t15, however, the row address strobe signal RAS goes low, ending the memory access operation, while the activation signal VPE is still high. Moreover, in this example the rise of the gate control signal GCS is delayed from the fall of the clock signal ACL. The potential of node N1 in the second charge pump 10-2 is thus lowered while the PMOS transistor 14 is still switched on, allowing charge to flow from the output node N0 back to node N1, lowering the output potential VPP to a level far below the predetermined level (VDD+Vt). When the gate control signal GCS goes high at time t16, the output node N0 is left at this low potential.

Although the third charge pump 10-3 now operates to restore the output node N0 to a potential above the predetermined level (VDD+Vt), the restoration takes place in a series of small steps and may not be completed before the row address strobe signal RAS goes high again. Thus the next memory access operation may begin with VPP at an inadequate level, below VDD+Vt.

In the first embodiment, the first charge pump 10-1 always boosts VPP to an adequate level at the start of a memory access operation, even if VPP was left at an inadequate level at the end of the preceding memory access operation. Moreover, since VPP starts at a higher level in the first embodiment, the second charge pump 10-2 is called on to operate less frequently than in the conventional voltage boosting circuit, so the type of problem illustrated in FIG. 5 occurs less frequently.

Next, a second embodiment will be described.

Figure 6:
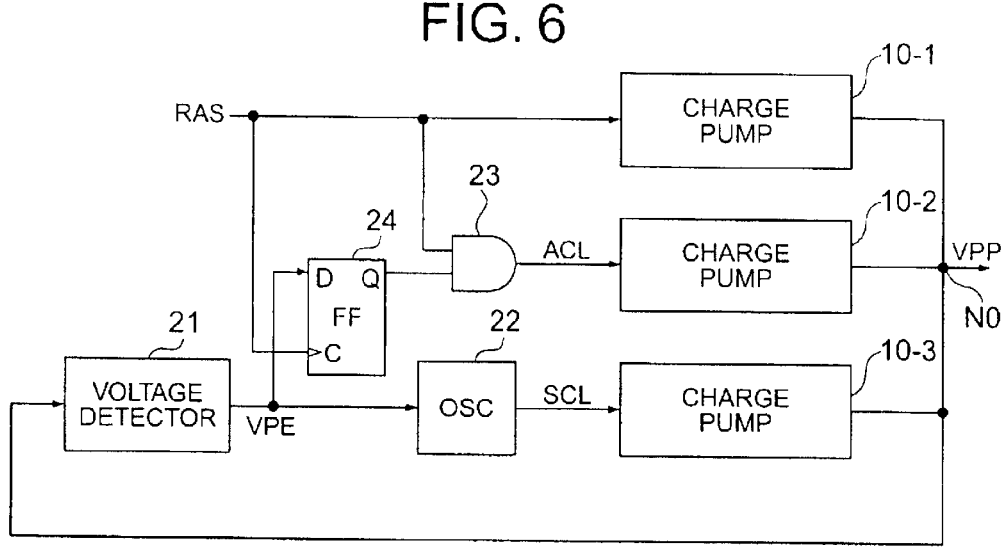
FIG. 6 is a block diagram of a voltage boosting circuit illustrating a second embodiment of the invention.

Referring to FIG. 6, the second embodiment adds a latching circuit, specifically a flip-flop (FF) 24 to the circuit configuration of the first embodiment. The flip-flop 24 has a data input terminal D, which receives the activation signal VPE from the voltage detector 21, a clock input terminal C, which receives the row address strobe signal RAS, and a non-inverting output terminal Q, which is connected to an input terminal of the AND gate 23. The flip-flop 24 is thus inserted between the voltage detector 21 and the AND gate 23, and delays the transfer of the activation signal VPE from the voltage detector 21 to the AND gate 23 so that the AND gate 23 receives VPE in synchronization with the row address strobe signal RAS.

In the second embodiment, the current Ipp drawn from node N0 during memory access operations is between the following limits, where Ip1 is the current that the first charge pump 10-1 is capable of supplying, and Ip2 is the current that the second charge pump 10-2 is capable of supplying.

$$Ip1 \leq Ipp < Ip1 + Ip2$$

The current-supplying capability Ip1 of the first charge pump 10-1 is preferably equal or nearly equal to the current Ipp drawn from node N0 during a memory access operation.

Figure 7:
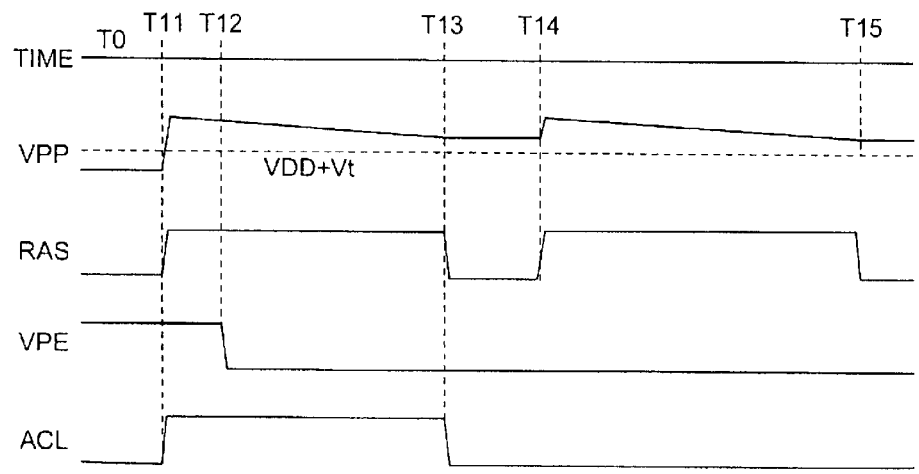
FIG. 7 is a timing waveform diagram illustrating the operation of the second embodiment.

An example of the operation of the second embodiment will be described with reference to FIG. 7.

In this example the boosted voltage VPP is initially (at time T0) below the predetermined level (VDD+Vt), so the activation signal VPE is at the high logic level.

A memory access operation begins when the row address strobe signal RAS goes high at time T11. The low-to-high transition of the row address strobe signal RAS activates the first charge pump 10-1 as in the first embodiment. The low-to-high RAS transition also causes the flip-flop 24 to transfer the high VPE level from the data input terminal D to the output terminal Q. Since both the Q output signal and the RAS signal are high, the clock signal ACL output from the AND gate 23 goes high, activating the second charge pump 10-2. The VPP potential at node N0 is therefore boosted by both the first and second charge pumps to a level well above the predetermined (VDD+Vt) level.

At time T12, after a detection delay, the activation signal VPE goes low, but the Q output of the flip-flop 24 remains high, so clock signal ACL remains high. Accordingly, the second charge pump 10-2 continues to supply charge from its internal node N1 (not visible) to the output node N0, as does the first charge pump !0-1.

At time T13, the memory access operation ends, and the row address strobe signal RAS goes low, de-activating the first charge pump 10-1. Clock signal ACL also goes low, de-activating the second charge pump 10-2. The potential VPP of node N0 now remains nearly constant at a level still above the predetermined level (VDD+Vt).

At time T14, the row address strobe signal RAS goes high again to begin another memory access operation, re-activating the first charge pump 10-1. The low logic level of the activation signal VPE is now transferred from the D input terminal of the flip-flop 24 to the Q output terminal and is input to the AND gate 23, holding clock signal ACL at the low logic level. The second charge pump 10-2 therefore remains inactive. Since the potential VPP of node N0 is boosted only by the first charge pump 10-1, it does not rise as much as at time T11, but still reaches an adequate level, since it started above the predetermined level (VDD+Vt).

At time T15, the row address strobe signal RAS goes low again, ending the memory access operation.

In the second embodiment, both rising and falling transitions of clock signal ACL are synchronized with the rising and falling transitions of the row address strobe signal RAS. Accordingly, the VPP potential is boosted at the start of each memory access operation, but is not re-boosted by the second charge pump 10-2 if it falls below the predetermined level (VDD+Vt) during a memory access operation. This prevents the type of incorrect operation of the second charge pump that was illustrated in FIG. 5, due to activation of the second charge pump 10-2 just before the row address strobe signal RAS goes low. It also prevents electrical noise associated with the operation of the second charge pump 10-2 from affecting memory access while the memory access operation is in progress. A further advantage is reduced fluctuation in the power-supply potential VDD and ground level due to simultaneous charge-pump activity and memory access activity, since the only charge pump that may operate during memory access is the third charge pump 10-3, which consumes and generates relatively little current.

Next, a third embodiment will be described.

Figure 8:
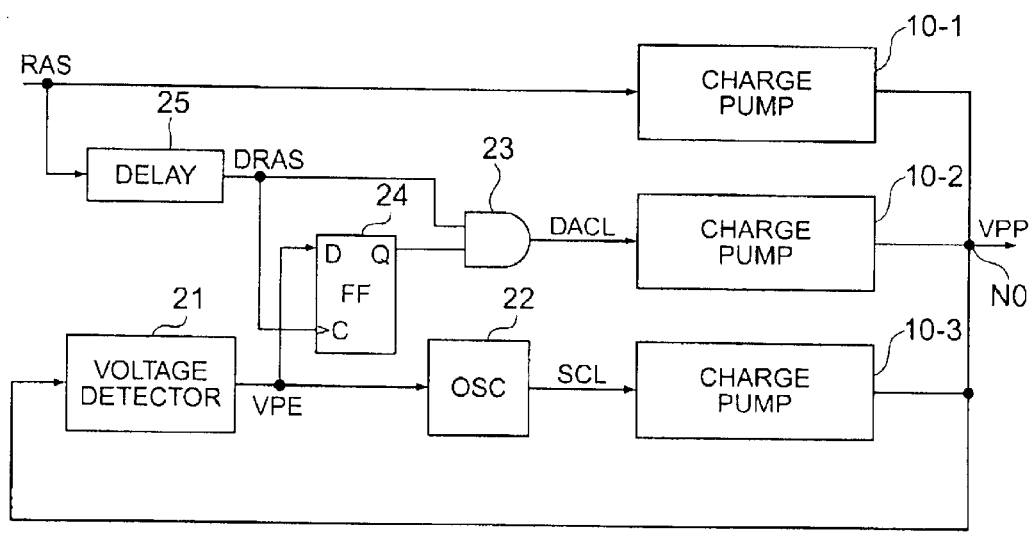
FIG. 8 is a block diagram of a voltage boosting circuit illustrating a third embodiment of the invention.

Referring to FIG. 8, the third embodiment adds a delay unit 25 to the circuit configuration of the second embodiment. The delay unit 25 receives the row address strobe signal RAS, and supplies a delayed row address strobe signal DRAS to the AND gate 23 and flip-flop 24, in place of the row address strobe signal RAS that was supplied in the second embodiment. The second charge pump 10-2 accordingly receives a delayed clock signal DACL.

The third embodiment operates in the same way as the second embodiment, except that the activation of the second charge pump 10-2 is delayed from the activation of the first charge pump 10-1 by a fixed interval, determined by the delay unit 25. Accordingly, if a memory access operation starts when the VPP potential of the output node N0 is below the predetermined level (VDD+Vt), the VPP potential is first boosted by the first charge pump 10-1, then boosted again, after the fixed interval, by the second charge pump 10-2.

By delaying the operation of the second charge pump 10-2 at the start of a memory access operation in this case, the third embodiment reduces the magnitude of the electrical noise generated at the start of the operation, because the first and second charge pumps 10-1, 10-2 do not operate simultaneously. The overall operation of the voltage boosting circuit also becomes more stable, because it draws current from the power supply (VDD) at a more even rate than in the second embodiment.

If the VPP potential is above the predetermined level (VDD+Vt) when the memory access operation starts, then only the first charge pump 10-1 operates, as in the second embodiment.

Figure 9:
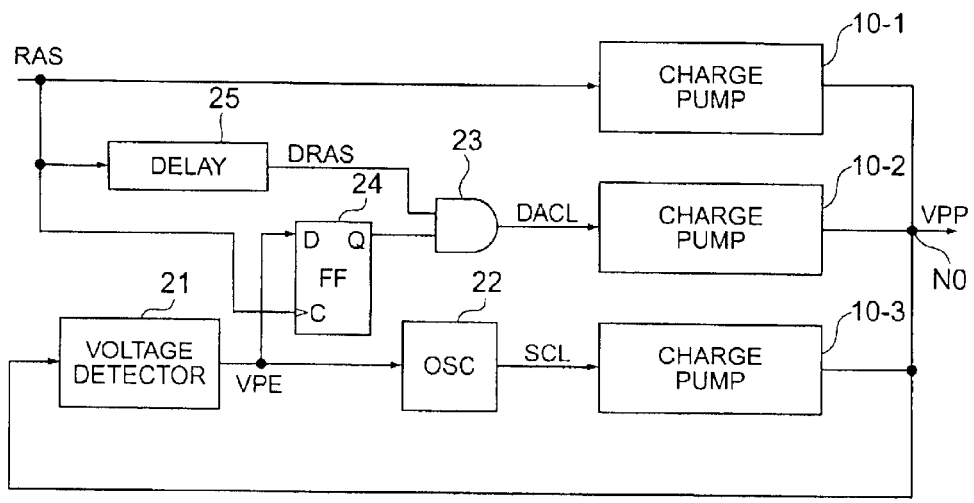
FIG. 9 is a block diagram of a voltage boosting circuit illustrating a variation of the third embodiment.

The third embodiment can be modified by supplying the non-delayed row address strobe signal RAS to the clock input terminal of the flip-flop 24, as in FIG. 9, so that the latching of the activation signal VPE by the flip-flop 24 is not affected by the delay unit 25.

Next, a fourth embodiment will be described. The fourth embodiment differs from the third embodiment in regard to the internal structure of the first charge pump 10-1.

Figure 10:
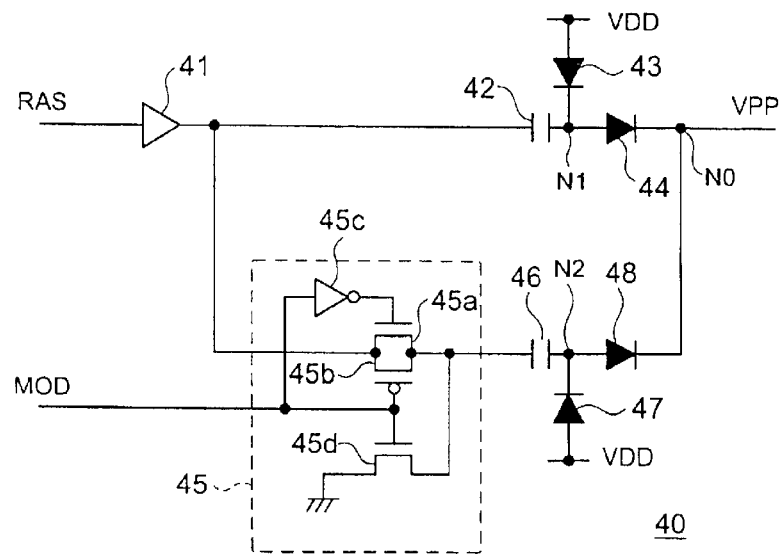
FIG. 10 is a circuit diagram of a charge pump used in a fourth embodiment of the invention.

Referring to FIG. 10, the first charge pump in the fourth embodiment has a buffer 41 that receives the row address strobe signal RAS, a capacitor 42 with a first plate connected to the output terminal of the buffer 41 and a second plate coupled to an internal node N1, a diode 43 coupled between the power supply (VDD) and node N1, and another diode 44 coupled between node N1 and the output node N0. Node N1 is coupled to the cathode of diode 43 and to the anode of diode 44.

The output signal of the buffer 41 is also coupled through a switching unit 45 to the first plate of a second capacitor 46. The second plate of the second capacitor 46 is coupled to another internal node N2. A diode 47 is coupled between node N2 and the power supply (VDD), and another diode 48 is coupled between node N2 and the output node N0. Node N2 is coupled to the cathode of diode 47 and to the anode of diode 48.

The switching unit 45 is controlled by a mode signal MOD. When the mode signal MOD is at the low logic level, the switching unit 45 is turned on and supplies the output signal of the buffer 41 to capacitor 46. When the mode signal MOD is at the high logic level, the switching unit 45 is turned off and its output to capacitor 46 is held at the ground level. The switching unit 45 comprises, for example, an n-channel metal-oxide-semiconductor (NMOS) transistor 45a and a PMOS transistor 45b coupled in parallel between the buffer 41 and capacitor 46, an inverter 45c that inverts the mode signal MOD, and an NMOS transistor 45d coupled between capacitor 46 and ground. The mode signal MOD is supplied to the gate electrodes of transistors 45b and 45d. The inverted mode signal MOD output from the inverter 45c is supplied to the gate electrode of transistor 45a. Transistors 45a and 45b form a transmission gate.

When the mode signal MOD is at the low logic level and the switching unit 45 is turned on, the charge pump in FIG. 10 operates with the combined capacitance of capacitors 42 and 46. While the row address strobe signal RAS is low, both capacitors 42, 46 are charged through diodes 43, 47, taking the internal nodes N1, N2 to the VDD potential level. When the row address strobe signal RAS goes high, both internal nodes N1 and N2 are boosted by capacitive coupling to substantially twice the VDD level, and current flows from these nodes N1, N2 through diodes 44, 48 to the output node N0, boosting the output potential VPP. When the row address strobe signal RAS goes low again, diodes 44, 48 prevent current from flowing back from the output node N0 to the internal nodes N1, N2.

When the mode signal MOD is at the high logic level and the switching unit 45 is turned off, transistor 45d is switched on, so the first plate of capacitor 46 is held at the ground level. Node N2 remains at the VDD level and is not boosted to twice that level. The output potential VPP is boosted above VDD only by the flow of current from node N1.

Accordingly, the first charge pump 10-1 in the fourth embodiment is capable of supplying more current at a boosted potential VPP when the mode signal MOD is low than when the mode signal MOD is high.

The second and third charge pumps 10-2, 10-3 in the fourth embodiment are similar to those in the third embodiment. The fourth embodiment also includes a voltage detector 21, an oscillator 22, an AND gate 23, a flip-flop 24, and a delay unit 25 as in the third embodiment, connected as in FIG. 8 or 9.

The mode signal MOD is tied to the high or low logic level according to the current consumption of the DRAM in which the fourth embodiment is used. Specifically, MOD is tied to the high logic level if the DRAM has a comparatively low current consumption, and to the low logic level if the DRAM has a comparatively high current consumption. In this way the difference between the current-supplying capability of the first charge pump 10-2 and the current requirement of the DRAM is reduced, thereby making the operation of the voltage boosting circuit more stable and reducing variations in the boosted VPP level.

The fourth embodiment can be modified by employing the charge pump in FIG. 10 as the first charge pump in the circuit configuration of the first embodiment (FIG. 1) or second embodiment (FIG. 6) instead of the third embodiment.

The charge pump in FIG. 10 can be modified by replacing some or all of the diodes 43, 44, 47, 48 with other types of switching elements, such as transistors.

The first, second, and third embodiments can be modified by employing charge pumps in which the gate controller 15 in FIG. 1 is eliminated and the PMOS transistor 14 is replaced by a diode having its cathode coupled to node N0 and its anode coupled to node N1, as in FIG. 10.

Applications of the invented voltage boosting circuit are not limited to DRAM. The invented voltage boosting circuit can also be used in, for example, a circuit that drives a liquid crystal display.

Those skilled in the art will recognize that further variations are possible within the scope defined by the appended claims.

What is claimed is:

1. A voltage boosting circuit receiving power at a power-supply potential, having an output node from which current is supplied to a load circuit, and receiving a control signal indicating when the load circuit is active, comprising:
   a first charge pump coupled to the output node and receiving the control signal, for boosting the output node to a potential exceeding the power-supply potential when the load circuit becomes active, the boosting ending while the load circuit is still active;
   a voltage detector for detecting the potential of the output node and generating an activation signal indicating whether the potential of the output node is below a predetermined level; and
   a second charge pump coupled to the voltage detector, for boosting the output node to a potential exceeding the power-supply potential if the control signal indicates that the load circuit is active and the activation signal indicates that the potential of the output node is below the predetermined level.

2. The voltage boosting circuit of claim 1, further comprising a latching circuit inserted between the voltage detector and the second charge pump and receiving the control signal, for synchronizing the activation signal with the control signal.

3. The voltage boosting circuit of claim 2, wherein, if the potential of the output node is below the predetermined level when the load circuit becomes active, the first charge pump and the second charge pump boost the potential of the output node simultaneously.

4. The voltage boosting circuit of claim 2, further comprising a delay unit for delaying the control signal, thereby causing the second charge pump to boost the potential of the output node after the first charge pump boosts the potential of the output node.

5. The voltage boosting circuit of claim 4, wherein the latching circuit receives the delayed control signal from the delay unit.

6. The voltage boosting circuit of claim 4, wherein the latching circuit receives the control signal, further comprising:
   a logic circuit receiving the delayed control signal from the delay unit and an output signal from the latching circuit and generating a signal that activates the second charge pump.

7. The voltage boosting circuit of claim 1, wherein the first charge pump has a first current-supplying capability, the second charge pump has a second current-supplying capability, and the load circuit draws current from the output node at a rate at least equal to the first current-supplying capability, but less than the sum of the first current-supplying capability and the second current-supplying capability.

8. The voltage boosting circuit of claim 1, wherein the first charge pump has a switchable current-supplying capability.

9. The voltage boosting circuit of claim 8, wherein the first charge pump comprises:

a first internal node;

a first capacitor capacitively coupling the control signal to the first internal node;

a first switching element supplying the power-supply potential to the first internal node;

a second switching element coupling the first internal node to the output node;

a second internal node;

a second capacitor coupled to the second internal node;

a transmission gate receiving a mode signal and supplying the control signal to the second capacitor according to the mode signal;

a third switching element supplying the power-supply potential to the second internal node; and a fourth switching element coupling the second internal node to the output node.

10. A voltage boosting circuit receiving power at a power-supply potential, having an output node from which current is supplied to a load circuit, and receiving a control signal indicating when the load circuit is active, comprising:

a first charge pump receiving the control signal as a first clock signal and supplying charge at a potential exceeding the power-supply potential to the output node;

a voltage detector detecting the potential of the output node and generating an activation signal indicating whether the potential of the output node is below a predetermined level;

a logic circuit receiving the control signal and the activation signal and generating a second clock signal; and a second charge pump receiving the second clock signal and supplying charge at a potential exceeding the power-supply potential to the output node.

11. The voltage boosting circuit of claim 1, wherein the first charge pump and the second charge pump each separately comprises:

an internal node;

a capacitor having one plate receiving the first clock signal and another plate coupled to the internal node;

a first switching element supplying the power-supply potential to the internal node; and a second switching element coupling the internal node to the output node.

12. The voltage boosting circuit of claim 10, further comprising:

an oscillator receiving the activation signal from the voltage detector and generating a third clock signal; and a third charge pump receiving the third clock signal and supplying charge at a potential exceeding the power-supply potential to the output node.

13. The voltage boosting circuit of claim 10, further comprising a latching circuit receiving the control signal and the activation signal and supplying the control signal to the logic circuit in synchronization with the activation signal.

14. The voltage boosting circuit of claim 13, further comprising a delay unit for delaying the control signal and supplying the delayed control signal to the logic circuit, thereby delaying activation of the second charge pump.

15. The voltage boosting circuit of claim 14, wherein the delay unit also supplies the delayed control signal to the latching circuit.

* * * * *